US005553209A

United States Patent [19]

Johnson et al.

[11] Patent Number: 5,553,209

[45] Date of Patent: Sep. 3, 1996

[54] METHOD FOR AUTOMATICALLY DISPLAYING MAP SYMBOLS

[75] Inventors: Kenneth R. Johnson, Brea; Willard H. Barrett, Garden Grove, both of Calif.

[73] Assignee: Hughes Aircraft Company, Los Angeles, Calif.

[21] Appl. No.: 187,953

[22] Filed: Jan. 28, 1994

[51] Int. Cl.$^{6}$ .................................................. G06F 15/20

[52] U.S. Cl. .................................................. 395/133

[58] Field of Search .................................. 395/160, 155, 395/161, 133; 345/113, 114, 115, 118, 119, 121

[56] References Cited

U.S. PATENT DOCUMENTS

| | | | |
|---|---|---|---|
| 5,295,244 | 3/1994 | Dev et al. | 395/161 |
| 5,361,349 | 11/1994 | Sugita et al. | 395/600 |

*Primary Examiner*—Phu K. Nguyen

*Attorney, Agent, or Firm*—W. K. Denson-Low

[57] ABSTRACT

In a Geographic Information System, a computer retrieves records from a data base for each map feature that lies within the extent of the displayed portion of the map. The records for point features are organized in "flat" structures where each map feature is represented by a single symbol, and in multi-level "hierarchial" structures where each feature is represented by a hierarchy of symbols representing different resolutions of the map features. For a hierarchial symbol structure, the level of records retrieved by the computer is determined by the scale of the map displayed to the screen. The computer determines, for each symbol at the particular map scale, whether the symbol extensively overlaps any other symbol The symbols that overlap significantly are modified to reduce the clutter by either merging the overlapping symbols into a single symbol including a numeric identifier or replacing the symbol and its siblings by the single parent symbol in the hierarchy. The symbols from the modified record are displayed to the screen.

26 Claims, 8 Drawing Sheets

METHOD FOR AUTOMATICALLY DISPLAYING MAP SYMBOLS

BACKGROUND OF THE INVENTION

1. Field of the Invention

The present invention generally relates to the field of Geographic Information Systems (GIS), and more specifically to a method for automatically displaying map symbols in accordance with the current map scale and symbol overlap.

2. Description of the Related Art

A typical GIS uses a computer to access records from a data base to display maps and map symbology on a display screen. The records contain the spatial and descriptive information associated with the features found in a map. The features are represented graphically as points, lines and areas. The records for point features also include a descriptive symbol of the feature. The graphical representation of these features, including the point feature symbols, are displayed on the computer screen.

In a military application, point features such as troop units, planes, and artillery pieces are added to the normal geographic features such as roads, waterways, and buildings, and superimposed over the geographic map on the display screen. An analyst might view the map display to determine troop strength and position. The analyst interacts with the GIS to zoom in or out on the map to display a desired portion or scale of the map. The features lying within the selected portion of the map are displayed as point symbols, lines or areas. It is very important that the map display clearly and accurately depict the map features at all map scales and for all regions of the map.

This method of displaying map symbology has a number of drawbacks. First, if the displayed portion of the map is densely populated with map symbols the display can be cluttered with overlapping symbols. Furthermore, as the analyst zooms out to display a larger portion of the map, additional symbols are displayed on the screen in closer proximity, thus increasing the clutter due to symbol overlap. Additionally, the degree of symbol clutter may vary throughout the display depending on the symbol overlap in local regions of the map. The symbol clutter detracts from the analyst's ability to accurately evaluate the visual display.

Currently, the only option available to the analyst is to zoom-in until the symbol clutter decreases to an acceptable level. Although the resolution of the map display can change, the resolution of the map symbology is fixed. This inhibits the analyst's ability to view large scale regions of the map and, if it is desired to differentiate the symbols, requires a great amount of the analyst's time to zoom-in on each portion of the entire region to gather the necessary information. The current method for displaying map symbology fails to effectively resolve the problem of clutter due to symbol overlap.

SUMMARY OF THE INVENTION

The present invention seeks to provide a method for displaying map symbology that resolves clutter due to symbol overlap, provides multiple symbol resolutions, changes the map symbology with the scale of the displayed map, adapts the symbology according to the symbol overlap in local areas of the displayed map, and minimizes user interaction.

These goals are accomplished by automatically selecting the proper resolution of map symbology to provide an uncluttered yet detailed display that is based on the degree of overlap between displayed symbols. A computer retrieves records from a database for each map feature that lies within the displayed portion of the map. The records for point features are organized in "flat" structures in which each map feature is represented by a single symbol, and in multi-level "hierarchial" structures in which each feature is represented by a hierarchy of symbols representing different resolutions of the map features. For a hierarchial symbol structure, the level of records retrieved by the computer is determined by the scale of the map displayed on the screen. The computer determines, for each point feature symbol and at the particular map scale, whether the symbol extensively overlaps any other symbol. The symbols that overlap significantly are modified to reduce the clutter by either merging the overlapping symbols into a single symbol that includes a numeric identifier, or replacing the symbol and its siblings by the single parent symbol in the hierarchy. The symbols from the modified records for point features are displayed on the screen along with the line and area features.

In an alternate embodiment of the invention, the degree of symbol clutter is computed as a density of symbols in a local region of the map. In another embodiment, the symbol size is reduced to alleviate symbol overlap. In yet another embodiment the level of records is determined from the map scale by a look-up table.

DESCRIPTION OF THE DRAWINGS

For a better understanding of the invention, and to show how the same be carried into effect, reference will now be made, by way of example, to the accompanying drawings in which.

Figure 3:
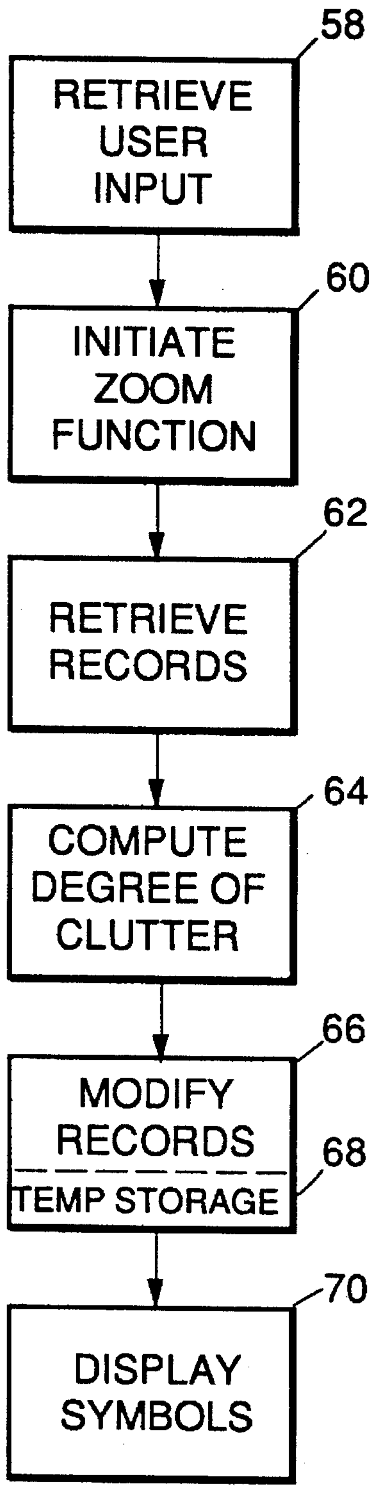
Figure 7:
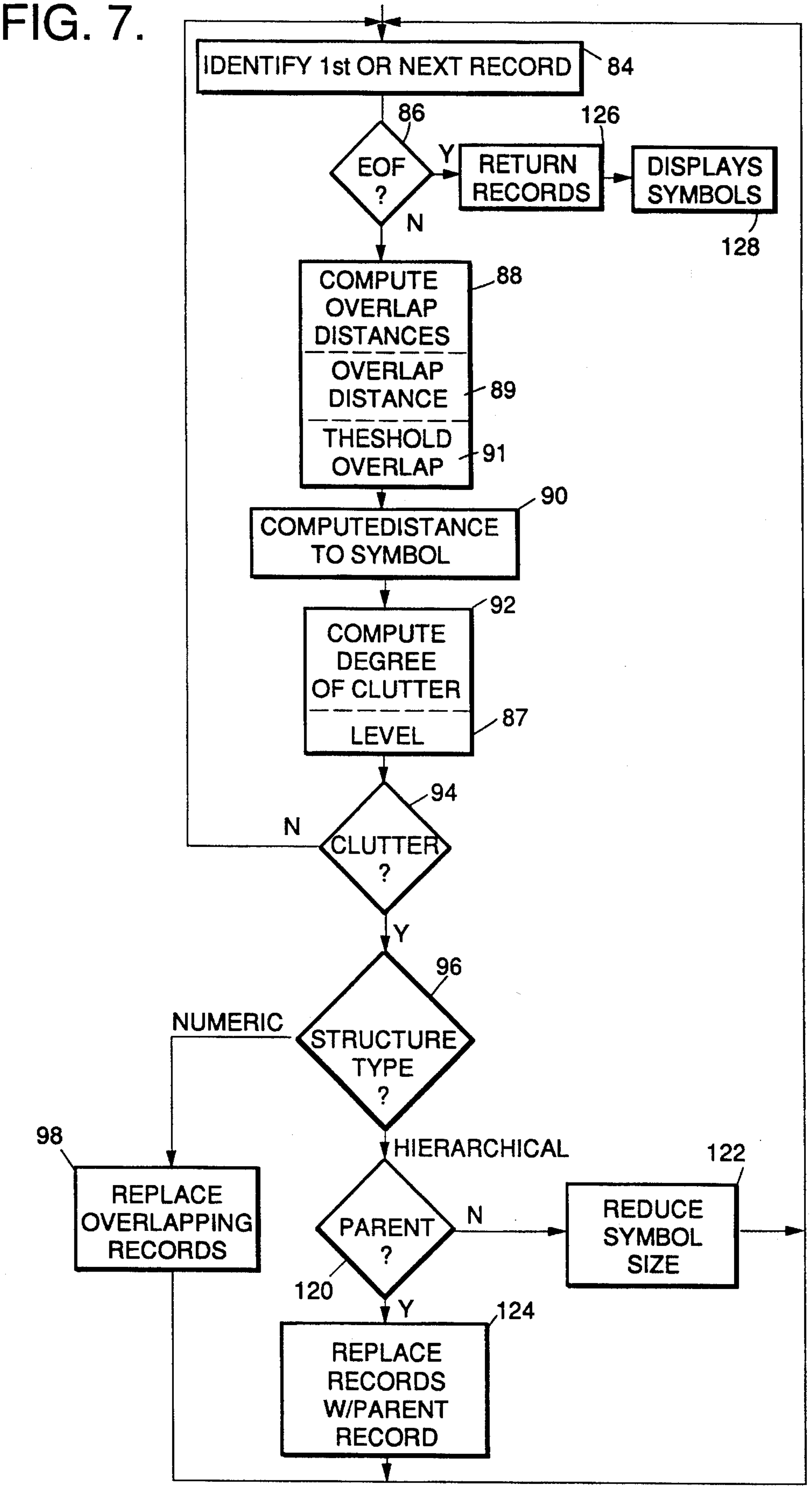
Figure 8:
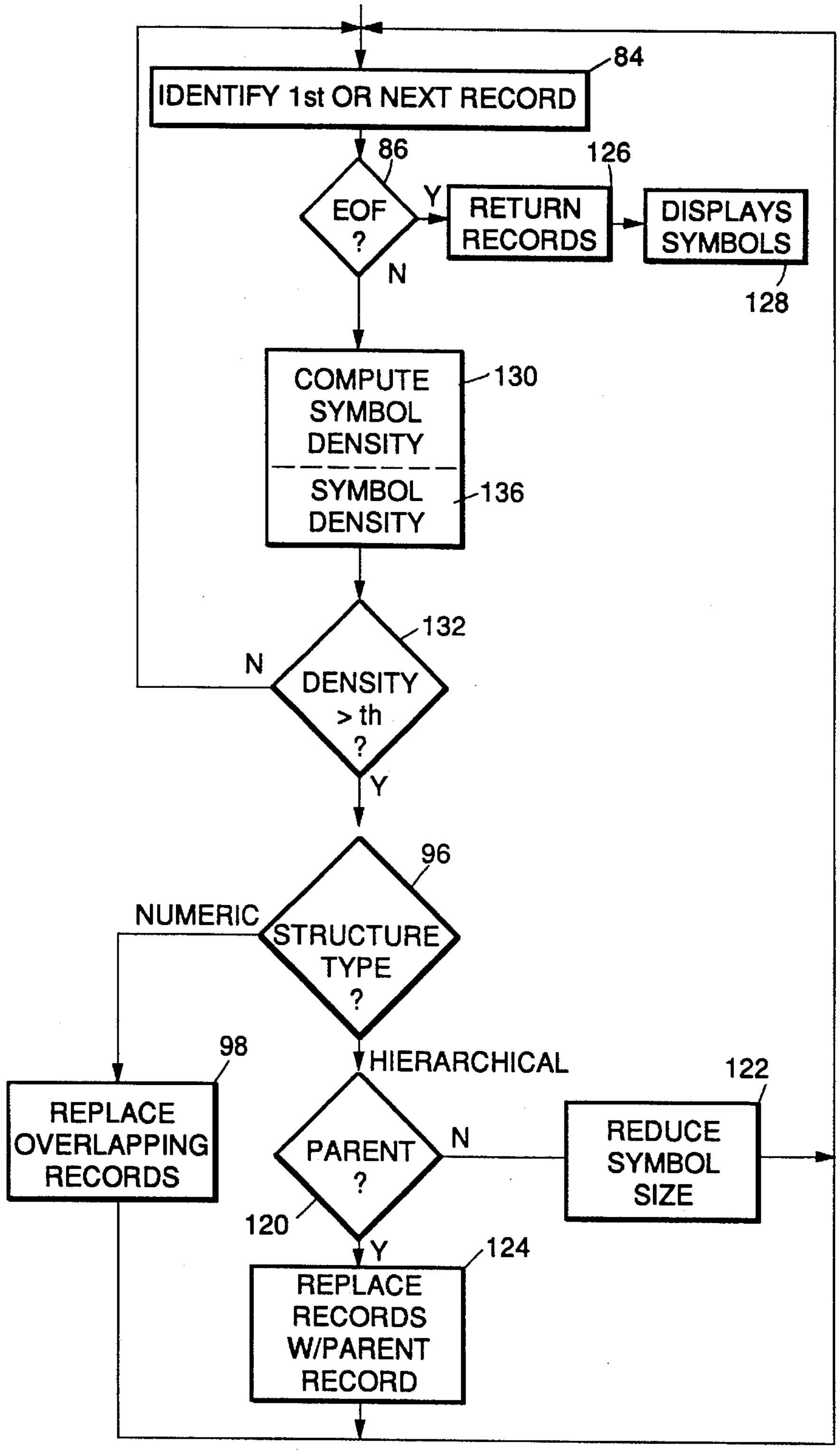
Figure 9:
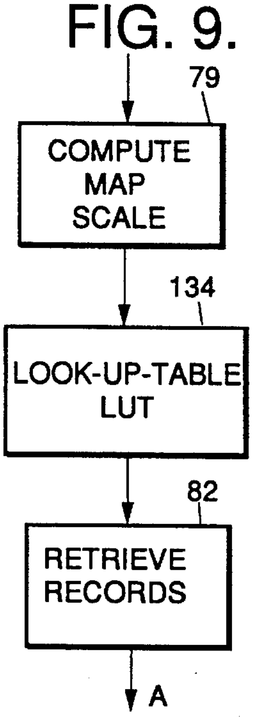

FIGS. *2a* and *b* are diagrams of a flat symbol structure and a multi-level hierarchical symbol structure, respectively;

FIG. 3 is a high level flow chart illustrating the basic steps for reducing the degree of clutter between map symbols;

FIGS. *4a* and *b* are flow charts illustrating how the method reduces the degree of clutter between map symbols;

FIGS. *5a* through *d* are displays illustrating the symbology for numeric symbols at various scales;

FIGS. *6a* and *b* are displays illustrating the symbology for hierarchical symbols at two different scales;

FIG. 7 is a flow chart of an alternate embodiment for reducing the degree of clutter between map symbols;

FIG. 8 is a flow chart of an alternate embodiment for computing the degree of clutter between map symbols by measuring the symbol density; and FIG. 9 is a flow chart of another embodiment for computing the initial record or symbology level for hierarchial structures.

DETAILED DESCRIPTION OF THE INVENTION

Figure 1:
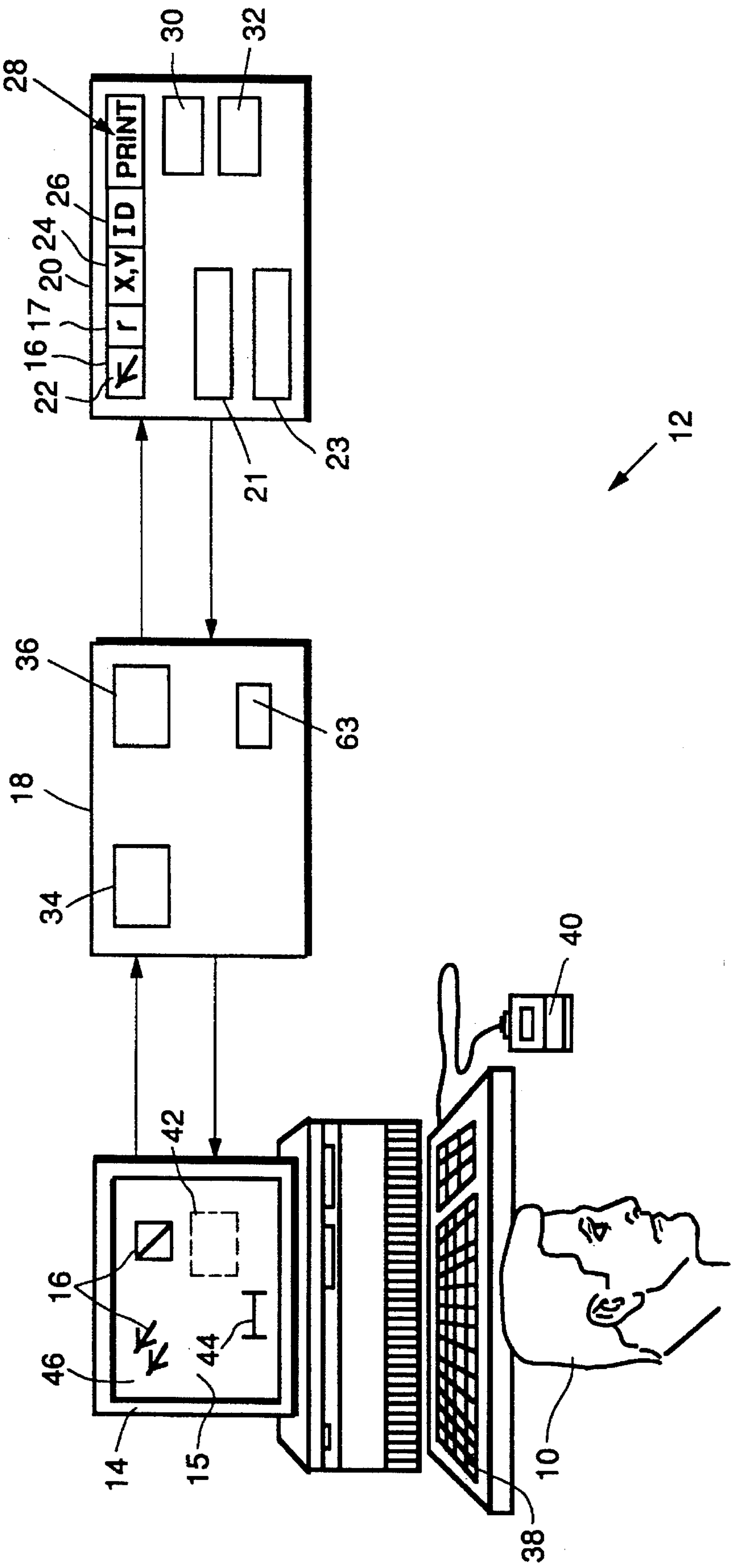
FIG. 1 is a block diagram of a GIS embodying the present invention for displaying map symbology.

FIG. 1 is a block diagram of a GIS embodying the present invention for displaying map symbology. Analyst 10 interacts with the GIS 12 to display maps and map symbology. The GIS 12 includes a screen 14 for displaying a map 15 and map symbols 16, a computer 18 for controlling map displays on the screen 14, and a data base 20 containing the map symbols 16 that define the map 15. The data base 20 contains line feature records 21, area feature records 23, and point feature records 22; each point feature record includes a symbol 16, a symbol size 17, a pair of x,y coordinates 24, a structure identifier 26, and in the case of a hierarchical structure, a parent record identifier 28. The data base also stores the boundary coordinates 30 of the entire map, and the boundary coordinates 32 of the portion of the map which is displayed on the screen. The boundary coordinates define the size or extent of the map. The computer 18 includes a zoom function 34 that allows the user to display different portions and scales of the map, and a symbol display algorithm 36 for controlling the manipulation and display of symbols 16 from the point feature records 22 to the screen 14.

The user 10 interacts with the GIS 12 through a keyboard 38 and a mouse 40 to select a portion 42 of the map 15 by employing the zoom function 34. The new boundary coordinates 32 of the displayed portion 42 of the map are provided to the computer 18. The zoom function 34 uses the coordinates 32 to define the size of the new map display 15, and selects all map records 21, 22 and 23 lying within the selected portion of the map. The records are provided to the symbol display algorithm 36. The zoom function also computes a scale 44 for the new map display by taking the ratio of the size of the displayed portion of the map, as defined by boundary coordinates 32, to the size of the entire map as defined by coordinates 30. In the prior art, the symbol display algorithm simply transmits the provided records directly to the display screen 14. In the present invention, the symbol display algorithm 36 processes the point feature records 22, in accordance with the scale 44 and a symbol overlap 46 caused by the proximity and size of the symbols 16, to compute a degree of clutter 63 for each record. The result is a display that has a high level of symbol resolution, with a minimum degree of clutter due to symbol overlap.

Figure 2A:
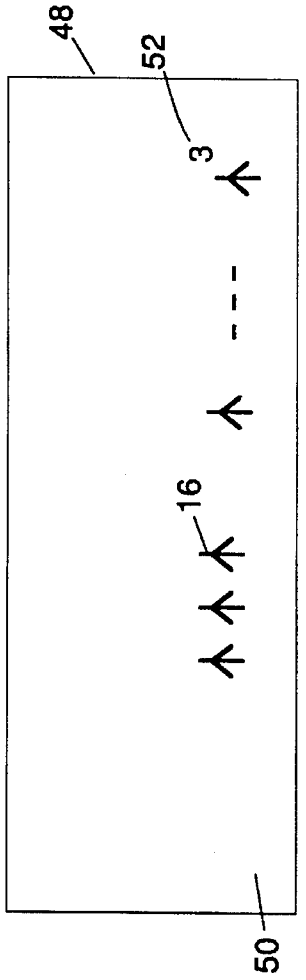

FIG. 2*a* is a diagram of a flat symbol structure. Each type of flat or numeric structure 48 for a point feature, e.g., planes, tanks or troops, is characterized by a single numeric class 50 of symbols 16. The symbols in a numeric class can be merged together to reduce the amount of symbol overlap. The merged symbol includes a numeric identifier 52 and has coordinates 24 equal to the centroid of the coordinates of the merged symbols.

Figure 2B:
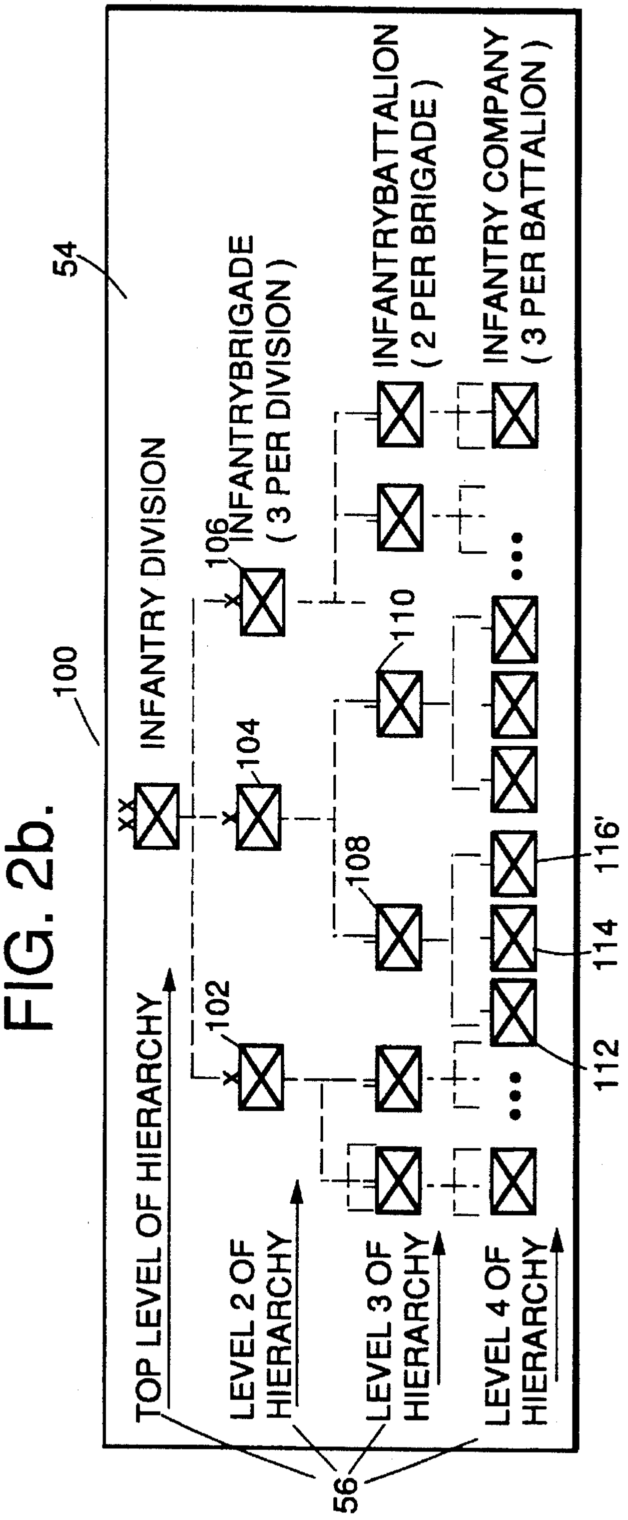

FIG. 2*b* is a diagram of a multi-level hierarchical symbol structure. Different types of hierarchical structures 54 for point features include troop units, aircraft, or tanks. The symbols at each level in the hierarchy are different, and therefore each level in the hierarchy has a corresponding class 56 of symbols 16. In FIG. 2*b* the division, brigade, battalion, and company are the four classes of symbols. The top level (level 1) of the structure is a single symbol which represents the coarsest level of symbology. Each successive level (level 2, level 3, . . . ) contains several symbols from that class which are the children of a parent symbol from the next higher level of the hierarchy and represent a finer resolution of symbology.

In FIG. 2*b* the symbol 100 representing the top level of the hierarchy has three children 102, 104, and 106 in level two. Each of these symbols has two children and specifically symbol 104 has children 108 and 110. Symbol 108 has three children 112, 114 and 116 at the lowest level in the hierarchy. Sibling symbols are defined as those symbols having the same parent symbol. Therefore symbols 102, 104 and 106 are siblings as are symbols 108 and 110. The records 22 which include the individual symbols, coordinates, symbol sizes, structure type identifier, and parent record are organized in the same hierarchical structure depicted for the symbols. If the symbols and the corresponding records are organized in such a hierarchical structure, the symbol display algorithm 36 reduces the degree of symbol clutter by selecting an initial level of symbology from the hierarchical structure in accordance with the scale 44 of the displayed map, and thereafter replacing symbols which substantially overlap other symbols with their parent symbol in the next higher level of the structure.

FIG. 3 is a high level flow chart illustrating the basic steps for reducing the degree of clutter between map symbols. The display of map symbology is initiated in step 58 when the computer retrieves the user input, which includes the desired portion of the map 42 for the symbol display algorithm 36. After retrieving the user input, the computer initiates the zoom function in step 60. In this step the computer identifies the data base records lying within the boundaries of the desired display, as defined by the boundary coordinates 32 of the portion 42, of the map 15, computes the scale of the displayed map as the ratio of the entire map size to the size of the displayed portion of the map, and displays the geographic map features including the symbols from the line 21 and area records 23. Thereafter, the computer initiates the symbol display algorithm by retrieving the identified point feature records 22 (step 62) and computing the degree of clutter 63 for each record 22 (step 64).

The degree of clutter relates to the overlap between the symbol and neighboring symbols as displayed on the screen. Although the symbol size and distance between symbols in terms of map coordinates may remain constant, the displayed distance between the symbols and thus the amount of overlap as seen on the screen changes as a function of the scale of the map. As the user zooms out to display a larger region of the map, the relative distance between the symbols shrinks and the overlap increases, thereby cluttering the visual display. As the user zooms in to display a local region of the map, the relative distance between symbols increases and the amount of clutter due to symbol overlap decreases.

In accordance with the degree of clutter 63 for each symbol, the computer then modifies the records in step 66 to reduce the overlap between the symbols and diminish the clutter perceived by the viewer on the screen. If the records 22 in the data base are organized in a flat or numeric structure 48, the records corresponding to each set of overlapping symbols are replaced by a record having the same symbol 16 and a numeric identifier 52 equal to the number of replaced symbols. The coordinates of the replacement symbol 16 are set equal to the centroid of the replaced symbols. For the case in which the symbols are organized into a hierarchical structure 54, the records are processed sequentially and if the symbol from the current record has an extensive overlap with any other symbol, the current record along with all of the records for the sibling symbols are replaced with the parent record. For example, using the hierarchy defined in FIG. 2, if the current record included symbol 102 and the computer determined that symbol 102 and 104 overlap extensively, the records for symbols 102, 104, and 106 would be replaced by the record for the parent symbol 100.

In step 66 the computer places the modified records into a temporary storage 68 in the data base without altering the original records in the data base. In step 70, the computer displays the symbols from the records in the temporary storage 68 to the display screen. The GIS operates continuously, updating the display of maps and map symbology in real time in response to any zooming operations initiated by the user or changes to the records in the data base.

Figure 4A:
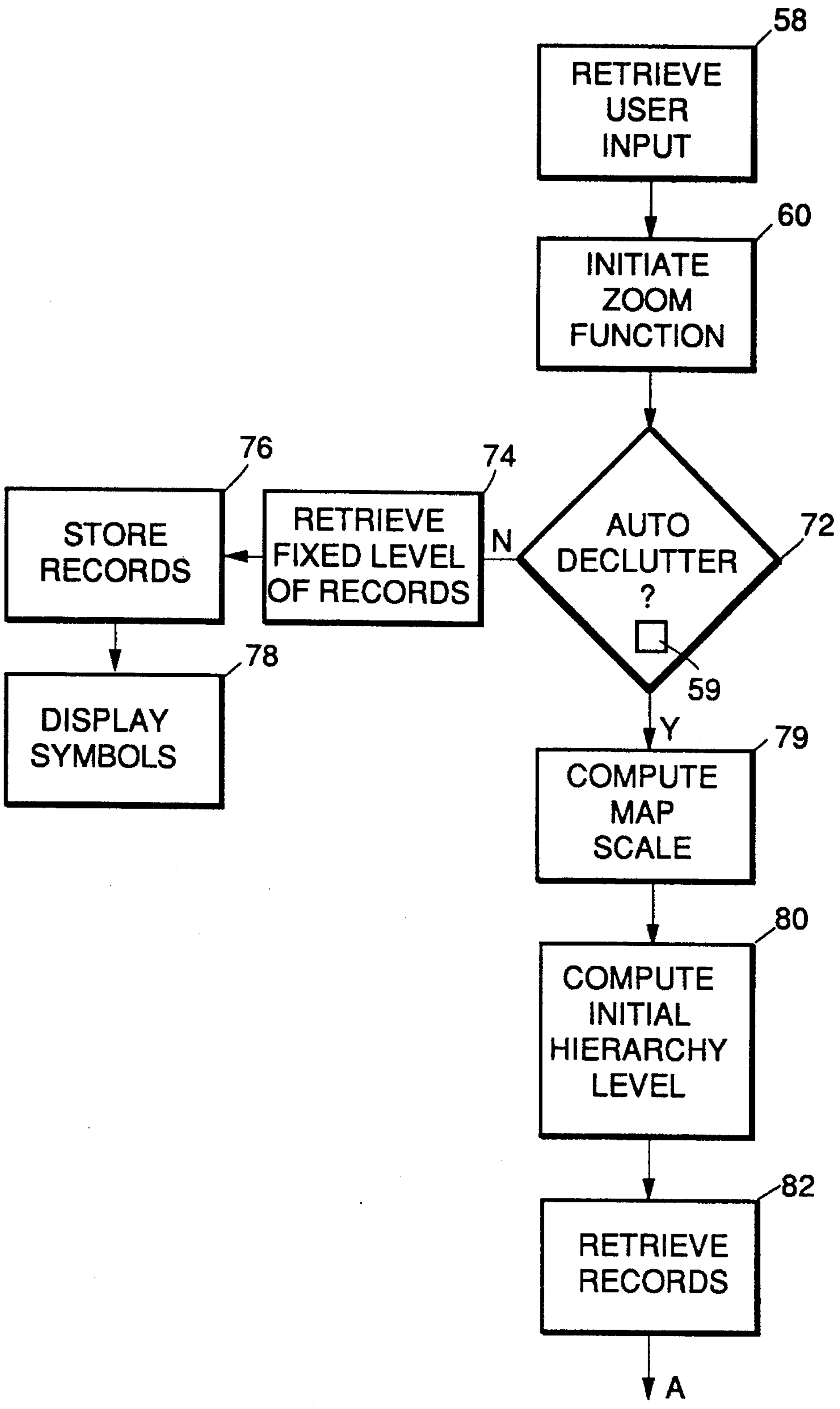

FIG. 4*a* is a flow chart illustrating the method for reducing the degree of clutter 63 between map symbols. In FIG. 4*a* the computer retrieves the user input (step 58) to initiate the zoom function (step 60) in which the computer identifies the records in the data base that lie within the desired portion 42, of the map 15, and displays the line and area features. Thereafter, (step 72) the computer reads a user specified control option 59 for the symbol display algorithm to determine its mode of operation. If the algorithm is not in automatic mode, the computer retrieves a fixed level of records 22 from the structure (step 74), in which the level has been specified by the user either as an input or as a default setting. For a numeric structure there is only the single lowest level, but for the hierarchical structures there are many levels for the user to choose from. This option allows the user to view a constant level of symbol resolution throughout the display, although the resolution might not be optimum and the display might be cluttered due to symbol overlap. The algorithm places the records into the temporary storage 68 in the data base (step 76). In step 78 the computer displays the symbols from the records stored in the temporary storage to the display screen.

If in step 72 the algorithm is found to be in the automatic mode, the computer computes the map scale (step 79). The map scale is an indicator of the resolution of the displayed map and is used to select an initial level of symbol representation in the hierarchical structure. The map scale is computed as the ratio of the map size to the display size and specifically:

$$\text{Scale} = \frac{(Ymap_{max} - Ymap_{min})}{(Ydisplay_{max} - Ydisplay_{min})} \quad \text{(eqn1)}$$

In the illustrated embodiment of the invention and in typical GIS, the display screen is square and thus all displayed portions of the map are square; otherwise the maps would be distorted when displayed on the screen. When the map and the display are both square, the scale can be computed using the only maximum and minimum y coordinates for each. The map scale attains its minimum value of one when the entire map is displayed to the screen. Displaying any smaller portion of the map produces a scale greater than one with the scale increasing as the displayed portion of the map becomes smaller.

In step 80, the computer determines an initial level of symbology for the hierarchical structures, based on the computed map scale. The map scale provides a rough estimate of the symbol resolution required to adequately display the map features. By entering the hierarchy at an intermediate level as opposed to the highest level, the number of computations and execution time can be reduced. The method for selecting the initial level errs on the side of the higher level or finer symbol resolution. Starting at too high a level will only increase the number of computations, but starting at too low a level will provide a level of symbology that is unnecessarily coarse.

In the hierarchical structures, the top level is labelled level 1, the next level down level 2, and so on. To select an initial hierarchical level from which to begin the declutter process, the value for the map scale is simply rounded up to the next highest integer unless the scale is exactly equal to an integer value, in which case it remains as that integer value. For example, if the entire map was displayed the scale would equal exactly one and the symbology at level one in the hierarchical structure would be selected. If the scale equalled 2.3, this value would be rounded up to 3 and the records corresponding to the third level of the hierarchical structure would be selected. In step 82, the computer retrieves the hierarchical records at the selected level and the corresponding numeric records from the data base.

Figure 4B:
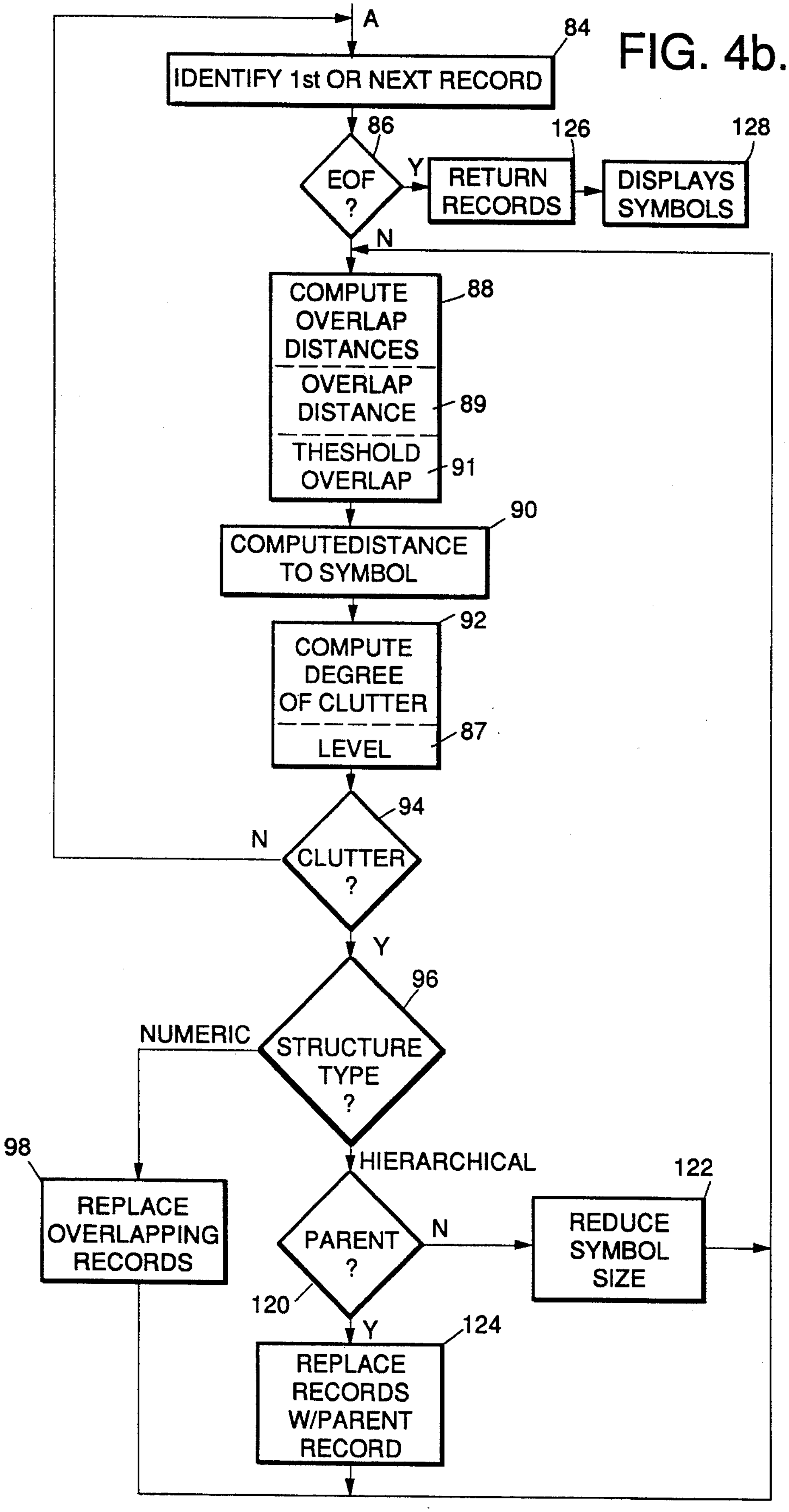

FIG. 4*b* is a flow chart illustrating the specific steps used to reduce the degree of clutter 63 between map symbols. After retrieving the appropriate point features records 22 from the data base, the computer identifies the first one of the these records to be the current record (step 84), and checks to see if the record is the last record in the file (step 86). The symbol display algorithm 36 sequentially assigns each record to be the current record in standard raster format, starting with the record corresponding to the extreme top left portion of the display and proceeding left to right and top to bottom to the bottom right portion of the display. The algorithm modifies the current record until the degree of clutter associated with the symbol from that record is less than some predetermined level 87. In step 88, the computer computes an overlap distance 89, for the current record.

The overlap distance is the minimum distance between the centroids of two symbols that must exist to avoid clutter. If the current record is from a numeric structure, a single overlap distance 89 is computed for any two symbols in the structure. Since symbols from a numeric structure are replaced by merging them with other symbols from the same structure, the computer only measures overlap due to symbols in the same numeric structure. Furthermore, since there is only one class of symbols in a numeric structure, the computer must only compute a single overlap distance. However, if the record is from a hierarchical structure, the algorithm will replace the record if the symbol extensively overlaps any other symbol. The computer determines an overlap distance from the current symbol to every other class of symbols including symbols in the same class, symbols in a different class in the same structure, and symbols in different hierarchical as well as numeric structures.

The overlap distance 89, is a function of three parameters: the size 17, of the symbol 16 of the current record, the size of the symbol 16 for another record, and a threshold overlap percentage 91. The size of a symbol is represented by a radius that defines a circle encompassing the symbol even though the symbols are not necessarily circular. The threshold overlap percentage 91 is the percentage of overlap between two symbols that can be tolerated before the degree of clutter 63 due to symbol overlap exceeds the predetermined level. A threshold of 100% would indicate that no cluttering could ever occur, whereas a percentage of 0% would define cluttering as occurring whenever two symbols overlap at all. The overlap distances for the current record are computed and stored. Letting the number of symbol classes equal K and an arbitrary class be denoted as the $j^{th}$ class, the overlap_distance of the $j^{th}$ class is given by:

$$\text{overlap\_distance} = (r_1 \leftrightarrows r_j) \times (100 - \text{threshold})\% \quad \text{(eqn. 2)}$$

where the threshold is a number between 0 and 100, $r_1$ is the radius of the current symbol and $r_j$ is the radius of a symbol from the $j^{th}$ class.

Having determined the overlap distances for the symbol in the current record, the computer computes the distance from the center of the current symbol to the centers of each subsequent symbol, step 90. Since the display is a scaled version of the map, the distance between the symbols displayed on the screen is a scaled version of the distance between the symbols in terms of the x,y map coordinates. The displayed distance $$D(S_1, S_n) = D_{xy}(S_1, S_n) \cdot \text{Scale} \quad \text{(eqn. 3)}$$

where Scale is the map scale as defined in eqn. 1, $D_{xy}(S_1, S_n)$ is the euclidean distance between the centers of the symbols $S_1$ and another symbol $S_n$, and $D(S_1,S_n)$ is the displayed distance between the symbols. $D_{xy}(S_1,S_n)$ is the displayed display distance $D(S_1,S_n)$ changes proportional to the map scale. If the current record is from a numeric structure, only the distance to symbols from that structure are computed.

In step 92, the computer computes the degree of clutter for the current record by comparing the distance to every symbol, $D(S_1,S_n)$ to the corresponding overlap distances, $overlap\_distance_j$ where the symbol $S_n$ is from the $j^{th}$ class. If any of the distances are less than the required overlap distance then the degree of clutter for the current record is said to exceed the predetermined level. In step 94, if the degree of clutter does not exceed the predetermined level, the programs returns to step 84, gets the next record and repeats the loop with that record as the current record. Note: in step 90 the distance is only computed from the current record to each of the subsequent records because any clutter between the current record and previous records was already resolved.

If in step 94, the degree of clutter exceeds the predetermined level, the computer in step 96 determines the structure type, i.e. hierarchial or numeric, of the current record. If the current record is from a numeric structure, the computer in step 98 replaces the current record and all other records from the same structure whose distance $D(S_1,S_n)$ is less than the overlap distance, with a new record including the same symbol and a numeric identifier. The value of the identifier is equal to the number of replaced records. The coordinates of the new symbol are computed as the centroid of the coordinates of the replaced records. If any of the replaced records have a numeric identifier greater than 1, the value of that identifier is accounted for in the numeric identifier of the new symbol, and the coordinates of that symbol are weighted by the value of the identifier when computing the centroid for the coordinates of the new symbol. The addition of the numeric identifier does not effect the size of the symbol, and therefore the overlap distance computed for the current symbol is applicable to the newly formed symbol.

If the structure type of the current record is hierarchial, the computer determines if the current record has a parent record in the structure i.e., whether the current record is at level one of the hierarchy, step 120. If the parent record does not exist, the computer in step 122 reduces the size of the symbol. If the parent record does exist, the computer replaces the current record and all sibling records with the parent record (step 124). The algorithm returns to step 88 and recomputes the overlap distances. In the case of the hierarchial structure the parent symbol may have a different size than the children, and obviously reducing the symbol size effects the computation of the overlap distance. The algorithm processes the current record until the clutter due to symbol overlap is resolved. At this point, the algorithm at step 94 returns to step 84 to get the next record for processing. When the algorithm reaches the last record in step 86, the computer returns the modified records to the temporary storage area in the data base, step 126. In step 128, the computer retrieves the record from the temporary storage area and displays the corresponding symbols to the screen.

Figure 5A:
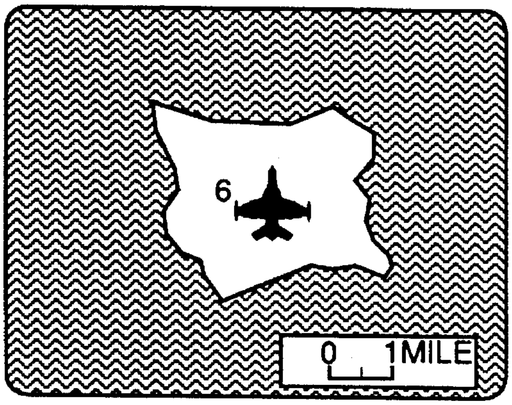
Figure 5B:
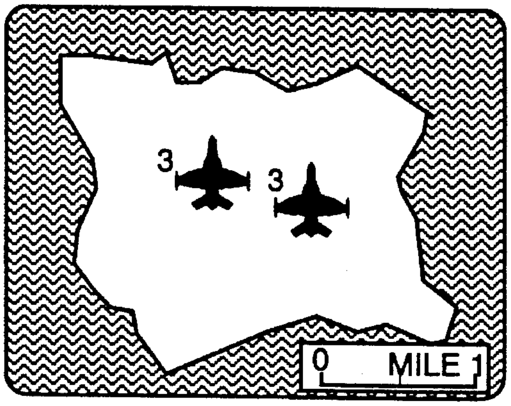
Figure 5C:
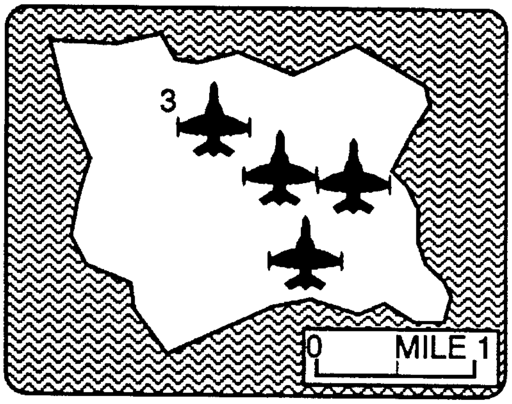
Figure 5D:
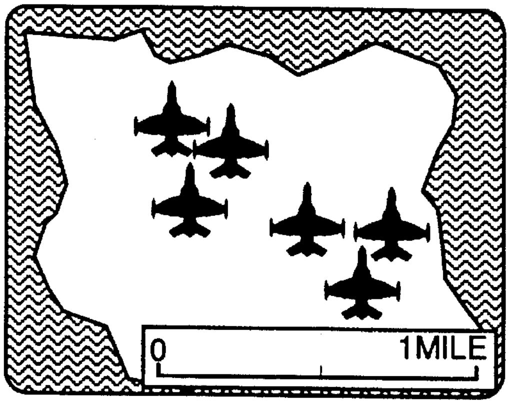

FIGS. **5*a*–*d* are displays illustrating the symbology for numeric symbols at various scales. In the displays illustrated in FIGS. 5*a*–*d* the user has zoomed in on a smaller and smaller portion of the map. In this case, there is a single numeric hierarchy represented by the symbol of an airplane. In FIG. 5*a* a single symbol with a numeric identifier of value six is displayed. The symbol resolution is appropriate for the scale of the display and avoids any signs of symbol clutter. In FIG. 5*b* the user has zoomed in to about twice the scale of the original display such that the six airplanes can now be clearly represented by two symbols each having a numeric identifier of value three and providing a higher resolution of map symbology without symbol overlap. In FIG. 5*c* the right most symbol can be further resolved into three separate planes without symbol overlap. However, replacing the left most symbol by three individual planes at this scale would create symbol overlap and therefore the algorithm displays that symbol with the numeric identifier of value three. In FIG. 5, the user has zoomed into a scale of four times the original scale displaying a much higher resolution of the map and an appropriately higher resolution of the map symbols in the form of the six individual airplanes. The map display algorithm selects the appropriate resolution of map symbology based on the scale 44 of the display and the overlap 46** of the symbols in the local areas of the display.

Figures 6A, 6B:
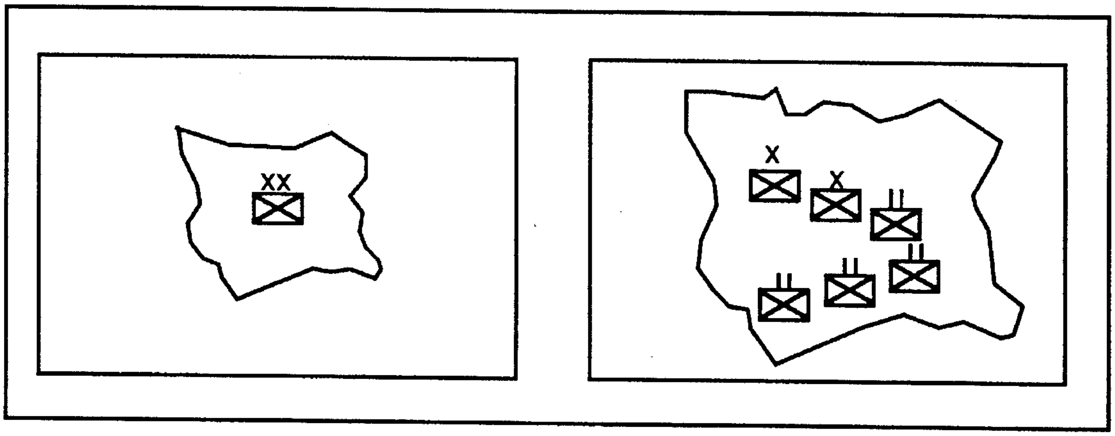

FIGS. **6*a* and *b* are displays illustrating the symbology for hierarchial symbols at two different scales. The hierarchial structure employed in FIGS. 6*a* and *b* was shown in FIG. 2*b*. In FIG. 6*a*, the display encompasses a relatively large portion of the map at low resolution. Symbology selected by the algorithm appropriately matches the scale of the display such that only the top node of the hierarchy is displayed. In FIG. 6*b*** the user has zoomed to twice the scale and resolution, and the algorithm has replaced the single top level symbol by two symbols in the second level of the hierarchy and four symbols in the third level of the hierarchy thus providing a detailed yet clean display for the user to view.

It will be appreciated that the invention is not restricted to the embodiments that have been described and illustrated and that variations may be made therein without departing from the scope of the invention as defined in the appended claims, and equivalent thereof.

FIG. 7 is a flow chart of an alternate embodiment for reducing the degree of clutter between map symbols. The flow chart in FIG. 7 replaces the flow chart of FIG. **4*b*. In the alternate embodiment, after steps 98, 122 and 124 the algorithm returns to step 84 instead of step 88**. The effect of this change is to limit the processing of the current record to a single iteration. A vast majority of the cluttering problems are resolved in the first iteration of the record and thus substantial improvement can be gained with a single pass through each record thereby speeding up the execution of the symbol display algorithm.

FIG. 8 is a flow chart of an alternate embodiment for computing the degree of clutter between map symbols by measuring the symbol density 136. Steps 88, 90 and 92 in FIG. **4*b* are replaced by step 130 in FIG. 8. In step 130, the computer computes the symbol density around the current record. The density can be computed as the number of symbols whose coordinates lie within a circle around the coordinates of the current record. The radius of the circle being equal to some number e.g. 3, times the radius of the current symbol. Step 132 replaces step 94 wherein the density, which is measured as the number of symbols found in the circle, is compared to some predetermined threshold number. If the density is less than the threshold no clutter exists and the algorithm returns to step 84. If the density exceeds the predetermined threshold the algorithm continues on to step 96. Step 98 of replacing the numeric type of record is modified slightly such that the current record and those records having symbols of the same class lying within the circle are replaced with a record including a single symbol, a numeric identifier, and coordinates equal to the centroid of the replaced coordinates. Following steps 98,122, and 124 the algorithm returns to step 84** providing only a single pass for each record.

FIG. 9 is a flow chart of another alternate embodiment for computing the initial record or symbology level for hierarchial structures and replaces step 80 in FIG. 4*a*. In step 79 the computer determines the scale of the displayed map. In step 134 the computer maps the scale 44 into the initial symbol level in the hierarchial structure by employing a look-up-table (LUT). The LUT can be preprogrammed for each type of hierarchial structure, the structures having varying number of levels and representing varying resolutions in their symbol classes. The mapping done by the LUT can be as simple as the rounding up function described in FIG. 4*a* or can represent a more advanced mapping obtained from trial and error.

We claim:

1. A method for displaying symbols from a data base to a physical display comprising:

retrieving a plurality of symbols from the data base;

computing a degree of clutter between said symbols;

automatically modifying the symbols to reduce the degree of clutter based upon said computation; and displaying the modified symbols on the physical display.

2. A method in accordance with claim 1, wherein the step of computing a degree of clutter between said symbols comprises:

computing the symbol overlap between at least two of said symbols.

3. A method in accordance with claim 2, wherein said symbols are organized in a plurality of symbol classes and wherein the symbol overlap is computed between symbols of the same class.

4. A method in accordance with claim 1, wherein the step of computing a degree of clutter between said symbols comprises:

computing a density of the symbols.

5. A method in accordance with claim 1, wherein the step of modifying the symbols comprises:

replacing the symbols in which the degree of clutter exceeds a predetermined level with a new symbol.

6. A method in accordance with claim 5, wherein the step of replacing the symbols includes:

including a numeric identifier in the new symbol, the identifier being equal in value to the number of replaced symbols.

7. A method in accordance with claim 5, wherein each symbol has an associated set of coordinates, and wherein the step of replacing the symbols includes:

computing a set of coordinates for the new symbol.

8. A method in accordance with claim 7, wherein the step of computing a set of coordinates comprises:

computing the centroid of the symbols for which the degree of clutter exceeds the predetermined level.

9. A method in accordance with claim 5, wherein said symbols are organized in a plurality of symbol classes, and wherein the step of replacing the symbols comprises:

replacing the symbols within each class in which the degree of clutter exceeds a predetermined level with a new symbol for that class.

10. A method in accordance with claim 9, wherein the step of computing a degree of clutter between said symbols includes computing a first degree of clutter between the symbols in the class for each class and a second degree of clutter between symbols in different classes, and wherein the step of modifying the symbols further comprises:

modifying the symbols in which the second degree of clutter between the symbols of different classes exceeds a second predetermined level to reduce symbol clutter.

11. A method in accordance with claim 10, wherein modifying the symbols comprises:

replacing each set of symbols with a new symbol.

12. A method in accordance with claim 11, wherein the step of modifying the symbols in which the degree of clutter between the symbols of different classes exceeds a second predetermined level comprises:

changing the size of the symbols.

13. A method in accordance with claim 12, wherein replacing each set of symbols includes:

including a numeric identifier in the new symbol for each set, the identifier being equal in value to the number of symbols in that set.

14. A method in accordance with claim 1, wherein the step of computing a degree of clutter identifies sets of symbols, each set including the symbols in which the degree of clutter between the symbols exceeds a predetermined amount.

15. A method for displaying symbols from a data base to a physical display, wherein the data base contains a multilevel hierarchical structure of records wherein the records at each successive level are the parent records of the records at the previous level, each record including a symbol, symbol coordinates, and identification of a parent record, comprising:

(a) selecting a record level in the hierarchical structure;

(b) retrieving a plurality of records from the data base at the selected level;

(c) computing a degree of clutter between said symbols in the retrieved records;

(d) automatically modifying the retrieved records by replacing the records wherein the degree of clutter exceeds a predetermined amount with their parent records, and (e) displaying the symbols from the modified records on the physical display.

16. A method in accordance with claim 15, wherein said structures are organized in a plurality of structure types and said symbols are organized in a plurality of symbol classes, each structure type being associated with one of the symbol classes comprising;

retrieving a plurality of records from the data base at the selected level for each structure type;

computing a degree of clutter for the records at the selected level in each structure type; and modifying the set of records in each structure by replacing the records wherein the degree of symbol clutter exceeds a predetermined amount with their parent records.

17. A method in accordance with claim 16, wherein the step of computing a degree of clutter between said symbols includes computing a first degree of clutter between the symbols in each structure and a second degree of clutter between symbols in different structures, and wherein the step of modifying the symbols further comprises:

modifying the symbols in which the second degree of clutter between the symbols in different structures exceeds a second predetermined level to reduce symbol clutter.

18. A method in accordance with claim 17, wherein the step of modifying the symbols in which the degree of clutter between the symbols in different structures exceeds a second predetermined level comprises:

changing the size of the symbols.

19. A method in accordance with claim 15, wherein the data base includes a set of boundary coordinates that determine which records are included in the set of records retrieved from the data base and wherein the step of selecting a level comprises:

determining the set of boundary coordinates; and computing the record level in the structure from the set of boundary coordinates.

20. A method in accordance with claim 15, further comprising:

(f) incrementing the record level, and repeating steps (c) and (d) until the degree of symbol clutter is sufficiently reduced.

21. A method in accordance with claim 15, wherein the step of computing the degree of clutter between said symbols comprises:

computing the symbol overlap between at least two of said symbols.

22. A method in accordance with claim 15, wherein the step of computing the degree of clutter between said symbols comprises:

computing a density of the symbols.

23. A method in accordance with claim 15, wherein the step of computing a degree of clutter partitions the records into a plurality sets, each set including the records in which the degree of clutter between the symbols exceeds the predetermined amount.

24. A method in accordance with claim 23, wherein modifying the symbols comprises:

replacing each set of records with the parent record.

25. A method for displaying symbols from a data base to a display screen, wherein the data base contains a digital map including map coordinates and a multi-level hierarchical structure of records wherein the records at each successive level are the parent records of the records at the previous level, each record including a symbol, symbol coordinates, and identification of a parent record, comprising:

(a) displaying a portion of the digital map to the display screen;

(b) computing a record level in the hierarchical structure from the map coordinates of the portion of the map displayed on the display screen;

(c) retrieving a set of records from the data base at the selected record level;

(d) computing a degree of clutter between said symbols in the retrieved set of records;

(e) automatically modifying the retrieved set of records by replacing the records wherein the degree of clutter exceeds a predetermined amount with their parent records, and (f) incrementing the record level, and repeating steps (d) and (e) until the degree of symbol clutter is sufficiently decreased, and (g) displaying the symbols from the modified set of records to the computer screen.

26. A computer-implemented method of reducing symbolic clutter, wherein a data base contains a multi-level hierarchical structure of records wherein the records at each successive level are the parent records of the records at the previous level, each record including a symbol, symbol coordinates, and identification of a parent record, comprising:

(a) selecting a record level in the hierarchical structure;

(b) retrieving a plurality of records from the data base at the selected level;

(c) computing a degree of clutter between said symbols in the retrieved records; and (d) automatically modifying the retrieved records by replacing the records wherein the degree of clutter exceeds a predetermined amount with their parent records.

* * * * *